April 21, 1970   SINJURO MIYACHI   3,507,591
APPARATUS AND METHOD FOR MEASURING A QUANTITY OF LIGHT
Filed Dec. 28, 1967
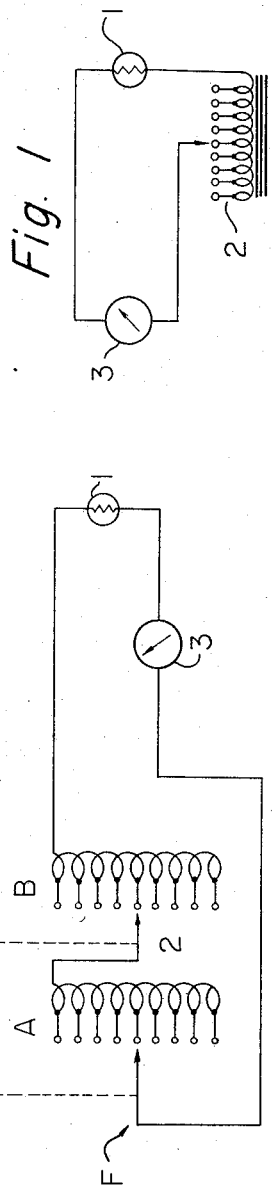
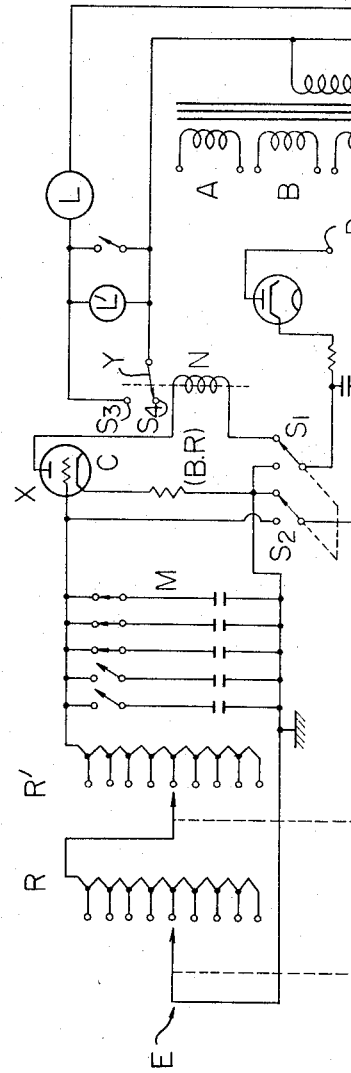
SINJURO MIYACHI,
*INVENTOR.*

# United States Patent Office 3,507,591
Patented Apr. 21, 1970

3,507,591
APPARATUS AND METHOD FOR MEASURING A QUANTITY OF LIGHT
Sinjuro Miyachi, 138 Tashiro-cho,
Nishinomiya-shi, Japan
Filed Dec. 28, 1967, Ser. No. 694,307
Int. Cl. G03b 27/76
U.S. Cl. 355—68                                      4 Claims

ABSTRACT OF THE DISCLOSURE

An apparatus for determining the best exposure time for carrying out printing of various photographs. A CdS photoconductive cell is connected in an electric circuit in which a fixed predetermined electric current flows. When light coming through a negative film is directed on the cell, a change of electric resistance occurs. Accordingly, the electric current changes. The circuit voltage is then controlled by a voltage control device so that this changed electric current is returned to the predetermined standard value. The voltage control device and a timer are interlocked to control the time for printing in accordance with the density of the negative.

---

The present invention relates to a process for carrying out a precise measuring for determining a time of exposure at the time of printing or taking a photograph and for measuring other quantities of light.

Heretofore, there has generally been used as a process for measuring a quantity of light a process which comprises providing an electric circuit containing a cadmium sulfide semiconductor (CdS cell), irradiating this CdS cell with light while applying a predetermined voltage to said circuit, utilizing the fact that depending on the quantity of the light the electric resistance of said CdS cell varies, and accordingly an electric current in said circuit containing said CdS cell varies, and measuring the quantity of light from the amount of said electric current.

In this case when the voltage applied to said circuit is constant, because there is a limit the function of a meter, only quantities of light within a certain range can be read. And the quantity of light is not precisely proportional to the photoelectric current, and therefore a correct quantity of light can not be measured.

The present invention relates to a process and apparatus for measuring a quantity of light capable of measuring correct quantities of light within a broad range and capable of interlocking an apparatus for measuring a quantity of light with a timing device for an apparatus for printing or enlarging a photograph.

The process of the present invention comprises making controllable a voltage to be applied to an electric circuit containing a cadmium sulfide semiconductor (CdS cell), irradiating a light to be measured on said CdS cell, controlling a power source voltage to be applied to said CdS cell so that an electric current varying according to the amount of said irradiated light will become constant (not by resistance adjustment), and measuring the quantity of light by said voltage.

FIG. 1 is a circuit diagram explaining the principle of the process of the present invention.

FIG. 2 is a circuit diagram of an apparatus combining a voltage control device having the electric circuit of FIG. 1 with a timing device for an apparatus for printing or enlarging a photograph so that the two may be interlocked with each other.

Now explaining the present invention is with reference to FIG. 1, light permeating an image on a negative film upon printing or reflected from an object to be photographed upon taking a photograph is directed onto a CdS cell 1 impressed with a voltage from a voltage control device 2. (If desired, one or more CdS cells can be used in the electric circuit.) Because an electric current (photo-electric current) flowing at this time varies according to the light falling on the CdS cell 1, when the voltage of the power source voltage 3 is so controlled that said photoelectric current appears constantly at an ammeter 3, the result is that the quantity of light falling on the CdS cell 1 (in other words, concentration of the image on a negative film or brightness of the object of a photograph) is shown in the voltage control device.

Accordingly, when the relationship among a power source voltage for a CdS cell, a quantity of light and an electric current is actually determined in advance, the quantity of light can be determined from the change of the voltage.

One embodiment in which said apparatus for measuring a quantity of light is combined with a timing device for an apparatus for printing or enlarging a photograph is shown in FIG. 2.

In FIG. 2, E is a timing device for an apparatus for printing or enlarging a photograph and F is said circuit for measuring a quantity of light.

This embodiment is so constituted that voltage coils A and B of the voltage control device F are interlocked with resistances R and R' of the timing device E, and as a result of the measurement of a quantity of light, the duration of the operation of the timing device is controlled.

In FIG. 2 the timing circuit E has connected in parallel the variable resistances R and R' interlocked with the voltage control device of the CdS cell F and condenser means M, and the timing circuit E is connected between the grid of an amplifier tube and a cathode resistance (ground terminal). An auxiliary relay N is connected in series with the anode of the amplifier tube. Further, said grid is connected with a terminal of a switch $S_2$ which is not normally contacted by the movable switch element.

Under normal conditions, as will be seen from FIG. 2, the cathode of the amplifier tube is grounded through the resistance B.R. On the other hand, the input from a terminal D is connected through switches $S_1$ and $S_2$ and said auxiliary relay with the anode of the amplifier tube and an electric current sufficient to energize the auxiliary relay N is flowing, and therefore the arm of switch Y will be moved to contact terminal $S_4$.

Now, if the switches $S_2$, $S_1$ are momentarily changed so that terminal D is connected with the timing circuit E, the condenser means M is charged by the input from the terminal D. Even through the switches $S_2$ and $S_1$ are immediately returned to the original positions, there is applied between the grid and the cathode resistance (ground terminal) the voltage charged on the condenser means M. Therefore, the electric current flowing in the amplifier tube is limited so that it is insufficient to energize the relay N, which condition continues until the charge on the condenser means M is completely discharged through the resistances R and R'. When the charge on the condenser means M is discharged, the voltage between the grid and the cathode resistance increases, and an electric current sufficient to energize the relay starts to flow again and the switch Y returns to the original position $S_4$.

Since it is known that a voltage charge on the condenser diminishes logarithmically as a time constant of the capacitance of the condenser and resistances R and R' due to discharge of the condenser, it is self-evident that the time of discharge is controllable by controlling the resistances R and R' or the capacitance of the condenser.

In FIG. 2, the resistances R and R' are connected with the voltage control device of the CdS cell circuit; however, it is apparent that the condenser M may be connected with the voltage control device or both the resistances and condenser may be together connected with the voltage control device, which is within the scope of the present invention.

The auxiliary relay of the timing device is ordinarily energized and the arm of switch Y is connected with terminal $S_4$. Accordingly, an electric current flows through a main lamp L and a safety light L'. The circuit is such, however, that in main lamp L' only a weak electric current flows and said lamp L is not lit and only the safety lamp L' is lit.

As mentioned above, after determining the time of exposure of a negative film to be printed by the resistances R and R' interlocked with the voltage coils A and B, by momentarily connecting the initiation switches $S_1$ and $S_2$ with the terminals on the left, the auxiliary relay becomes inoperative, the arm of switch Y is connected with terminal $S_3$, the irradiation electric bulb L is lit and the input from the terminal D charges the condenser M through the switches $S_1$ and $S_2$. Upon returning the initiation switches to the original positions, the condenser simultaneously starts discharge and during the discharge the electric bulb L is kept lit. Upon completion of the discharge, the amplifier tube again becomes conductive so as to operate the auxiliary relay N. The arm of switch Y moves to terminal $S_4$ from terminal $S_3$, the electric bulb L is extinguished and the printing or enlargement is completed.

The sequence of the process of the present invention in detail with reference to a case of actual printing or enlargement of a photograph (especially printing or enlargement of a color photograph), is as follows.

Namely, a negative film and a printing paper of the same quality (same characteristics) as the negative film are prepared in advance, and the negative film is set in an exposure mechanism.

Next the CdS cell is positioned at a place where the printing paper is to be positioned, and light is passed through the image on the negative film and falls on said cell, and the voltage of the voltage control device is tentatively selected (namely, the time of exposure of a timing device is determined) and an electric current is made to flow in a CdS cell circuit. Next, the CdS cell is removed from said location of the printing paper, and by momentarily pushing down the initiation switch of the timing circuit, the electric bulb is lighted for the proper time to carry out printing or enlargement. Finally, the printed paper or enlargement is developed and the development treatment is observed by the naked eyes to check tone of color development (color tone), etc.

Said operations are repeatedly carried out by making the voltage of the voltage control device another value and in order to adapt said operation for the actual requirements, clear actual amendment, application and modification are carried out.

Finally when the tone (of color development condition and color tone) of the printing paper becomes best for the actual requirement for printing or enlargement, the value of an electric current in the CdS cell circuit is recorded, which value of the electric current is made a guide for determining the time of exposure.

Namely, in printing or enlargement of a negative film or a printing paper of the same quality (same characteristics), printing or enlargement is carried out while adjusting the voltage of the voltage control device until a value of an electric current in the CdS cell is experimentally proved to result in the highest printing or enlargement quality, especially in case of a color film.

As mentioned above, once the most suitable value of the electric current in the CdS cell is experimentally decided, with reference to a negative film or a printing paper of the same quality, it is possible to automatically decide the most suitable time of exposure. It has been experimentally proved that the process of the present invention as mentioned above achieves a remarkable effect especially in case of printing or development of color film which has heretofore required very troublesome processes in which it was still difficult to obtain good results.

For determining the time of exposure for each color necessary in case of printing or enlarging a color film; a time of exposure for each color may be decided in sequence by using one combination of said circuit for measuring a quantity of light with a timing device, however, said time of exposure may be determined separately by using a plurality of said combinations.

It goes without saying that said one combination may be used for printing and enlarging a monochrome film; moreover, it is apparent that it is possible to use a circuit for measuring a quantity of light only as an instrument for measuring a quantity of light and to manually operate a timer of an entirely different structure operating mechanically.

Features of the process of the present invention are:

(1) Since it is possible to control the voltage to be applied to a CdS cell circuit until a certain electric current flows within the range of the operating voltage of the CdS cell, a quantity of light within a very broad range may be measured.

For instance, it is possible to measure a very small quantity of light within the range of operating voltage of the CdS cell.

(2) Moreover, measuring is easier when the quality of light is low.

(3) It is possible to interlock the apparatus according to the process of the present invention with a timing device for an apparatus for printing or enlargement of a photograph.

(4) In case resistance is used instead of a CdS cell and control is effected by said resistance, the value of the resistance and value of the electric current are not proportional and when the quantity of light is small, by controlling the resistance it is not possible to precisely measure the quantity of light. However, in case a voltage to be applied to a CdS cell circuit is controlled as in the present invention, since the voltage and the quantity of light are in a linear relationship, there is an advantage in that however small the quantity of light may be, it can be precisely measured.

This advantage is especially important when measuring a very small quantity of light such as in the case of enlarging a color film.

What is claimed is:

1. An apparatus for setting exposure time for printing or enlarging a negative, comprising a circuit having a CdS cell, a voltage control device, a source of constant voltage, and an ammeter electrically coupled to each other for impressing a voltage on said cell which can be controlled by said voltage control device to keep the current at a predetermined fixed value, and a timer interlocked with said voltage control device for governing the proper amount of exposure of the negative, whereby when light passing through the negative film falls on said CdS cell, the resistance of the CdS cell changes in accordance with the density of the negative, the voltage in the circuit is controlled so that the photoelectric current in the CdS cell returns to the predetermined value, and the motion of said voltage control device is transmitted to the timer to adjust the timer to the proper exposure time.

2. An apparatus for automatically determining the exposure time for printing or enlarging a negative film of a photograph, comprising an electric circuit for measuring a quantity of light and having a CdS photoconductive cell, an ammeter and a power source voltage control device electrically coupled to each other for impressing a voltage on said cell which can be controlled by said voltage control device to keep the circuit at a predetermined fixed voltage resistance and at least one condenser mechanically interlocked with said voltage control device, an amplifier tube having an anode, a cathode and a grid therebetween, said timing circuit being coupled between the grid and the cathode, a relay coupled to the anode of said amplifier tube, an input means for feeding an input to said amplifier tube, switch means for connecting said input means with said anode or with said timing circuit, an electric circuit having a switch operated by said relay and an irradiation electric bulb, said switch means normally connectng said input to said anode and said switch being opened when said relay is energized so that said irradiation electric bulb is not energized, whereby, when said apparatus is to be operated, the voltage control is adjusted until the predetermined current is flowing, the resistances and condenser thereby being adjusted for a proper exposure time, and said switch means is switched so that the input is connected with said timing circuit and said timing circuit impresses an input voltage on sad amplifier tube so that electric current sufficient to energize said relay connected with said amplifier tube is prevented from flowing for the time of the exposure voltage control device showing a quantity of light measured by said CdS cell and said switch is closed for that length of time, and said irradiation electric bulb is lit for that length of time.

3. An apparatus as claimed in claim 2 wherein means are provided for lighting said irradiation electric bulb sequentially a plurality of times for exposure of each color sequentially for a time as determined by said voltage control device in response to quantities of light measured by said CdS cell via said timing circuit to carry out printing of a color photograph.

4. A method of setting exposure time for printing or enlarging a negative, comprising exposing to light coming through the negative a CdS cell in a circuit having a voltage control device, an ammeter and a constant voltage supply supplying voltage to said cell such that in the absence of light on the cell a constant predetermined current flows in the circuit, adjusting the voltage control device so that the current returns to the predetermined value, utilizing the motion of the voltage control device to move a timer means for adjusting the timing of an exposure device to change the exposure time to correspond to the amount of light falling on the said cell.

References Cited

UNITED STATES PATENTS 3,397,611  8/1968  Davies _____ 355—68

NORTON ANSHER, Primary Examiner

R. A. WINTERCORN, Assistant Examiner

U.S. Cl. X.R.

356—226